Nov. 17, 1953

L. GIULIOLI ET AL 2,659,148

BULB-EDGE GLASS-CUTTING MECHANISM

Filed March 9, 1951

INVENTORS
Louis Giulioli and
BY  T. A. Insolio

Webb, Mackey & Burden
THEIR ATTORNEYS

Nov. 17, 1953 L. GIULIOLI ET AL 2,659,148
BULB-EDGE GLASS-CUTTING MECHANISM
Filed March 9, 1951 2 Sheets-Sheet 2

INVENTORS
Louis Giulioli and
T. A. Insolio
BY
Wise, Mackey & Burdew.
THEIR ATTORNEYS Patented Nov. 17, 1953

2,659,148

UNITED STATES PATENT OFFICE 2,659,148

BULB-EDGE GLASS-CUTTING MECHANISM

Louis Giulioli, Okmulgee, Okla., and Thomas A. Insolio, Ellwood City, Pa., assignors to American Window Glass Company, Pittsburgh, Pa., a corporation of Pennsylvania Application March 9, 1951, Serial No. 214,657

1 Claim. (Cl. 33—42)

Broadly, our invention is directed to improvements in means for scoring a traveling sheet of glass; but more particularly, our invention is directed to a bulb-edge glass-cutting mechanism that will always score a strip of predetermined width along the bulb-edge of the moving glass sheet.

In the manufacture of glass in the form of a continuous sheet, which can be subsequently cut to any desired length size, the glass is drawn vertically from a bath of molten glass in the drawing pit and is either drawn vertically through a cooling lehr or is turned through 90° and passed through a lehr in a horizontal position. In the drawing of sheet glass a thickened edge is formed which is known as a bulb-edge. These bulb-edges must be cut off so that the rest of the glass sheet is flat. It is obviously desirable to salvage the bulb-edge for commercial use, such as for example, shelves for medicine cabinets or glass panes for window ventilators. To this end, the moving glass sheet is scored or cut lengthwise in a line spaced a desired distance from the bulb-edge, so that a border strip of the glass can subsequently be broken off. Preferably the distance is adjustable so that different widths of strip can be obtained.

However, in conventional bulb-edge glass-cutting mechanisms now in use, the actual cutter for the glass is attached to a support which is fixed relative to the glass-making machine. Accordingly, the score line which the cutter makes on the glass is fixed relative to the support but varies relative to its distance from the edge of the moving glass sheet because of sidewise weaving of the glass sheet. With some machines this weaving can, at times, be as much as a half-inch or more. Accordingly, the score line on the glass sheet is not always parallel to the edge of the glass sheet; that is, the scoring is not spaced a constant distance from the glass-edge at all points thereof.

It is a primary object of our invention to provide a bulb-edge glass-cutting mechanism that will cut or score a line on a moving glass sheet which is always a fixed or constant distance from the edge of the glass sheet.

Another object of our invention is to provide a bulb-edge glass-cutting mechanism which will score or cut a moving glass sheet in a line which is a definite distance from the edge of the glass sheet, the mechanism including adjusting means so that the cut can be made at any desired fixed distance from the glass edge.

In accordance with presently preferred embodiments of our invention, a transmitter or sensing means is provided having a member that follows the position of the bulb-edge of the glass sheet, and controls the position of a glass cutter so that the latter follows the movement of the member and hence of the bulb-edge. For causing the cutter to follow the transmitter member, an interconnecting means is provided between the two. Preferably this interconnecting means is mechanical and comprises a stiff bar to which the member and the cutter are secured at a fixed, but adjustable, distance apart; this distance corresponding to the width of the strip to be cut. In the embodiments herein shown, the transmitter member comprises a rotatable guide wheel that is spring pressed against the bulb-edge so that it will always follow the position of the bulb-edge on the moving glass sheet.

In the accompanying drawings, we have shown two embodiments of our invention. In the drawings—

Figure 1:
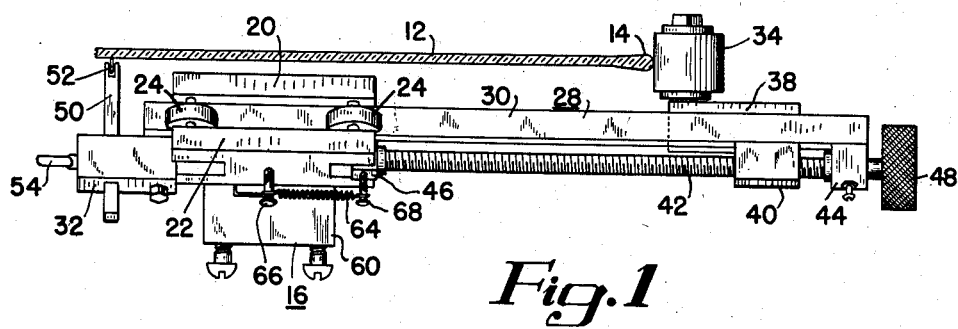
Figure 1 is a horizontal view of a bulb-edge glass-cutting mechanism embodying our invention, the mechanism being shown in an operating position.
Figure 2:
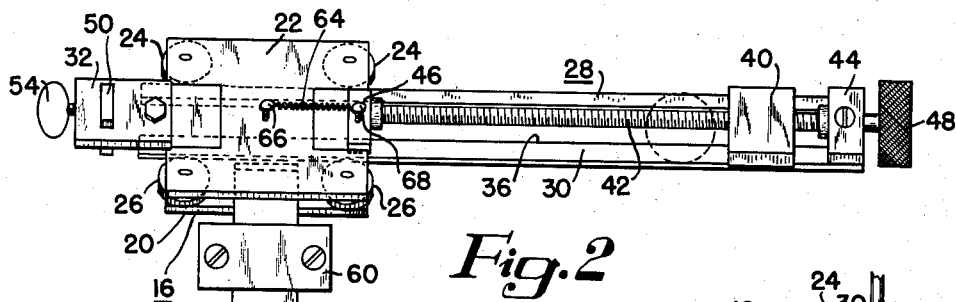
Figure 2 is an elevational view of the cutting mechanism of Figure 1.
Figure 3:
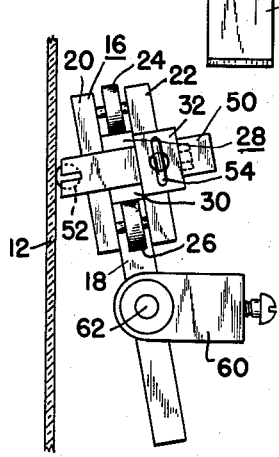
Figure 3 is a vertical side view of the mechanism looking at it from the glass-cutter side.

As shown in the drawings, a vertically upwardly moving glass sheet, indicated by the reference numeral 12, has bulb-edges 14 at each of its lengthwise sides. In accordance with our invention a cut or line is to be scored or cut at a predetermined fixed distance from either or both of the bulb-edges. For a single cut a single bulb-edge glass-cutting mechanism embodying our invention is used; but for simultaneously cutting the glass sheet inwardly from both of the bulb-edges two of the mechanisms may be used. However, since the principles underlying the mechanisms in accordance with our invention are the same, in the interests of brevity a single mechanism scoring a glass sheet is shown and described herein.

Referring to the embodiment shown in Figures 1–4, the bulb-edge glass-cutting mechanism comprises a guide bar holder which is indicated generally by the reference numeral 16. The guide bar holder 16 comprises a lever bar 18, a pair of spaced parallel guideway plates 20 and 22 secured to opposite sides of the upper end of the lever bar 18 and extending upwardly therefrom, and a plurality of anti-friction guide rollers comprising spaced upper rollers 24 spaced from associated spaced lower rollers 26. The rollers 24 and 26 are rotatably carried by the guideway plates 20 and 22 so as to form a horizontal guideway of uniform width for slidably receiving a bar assembly that is indicated in its entirety by the reference numeral 28.

Figure 4:
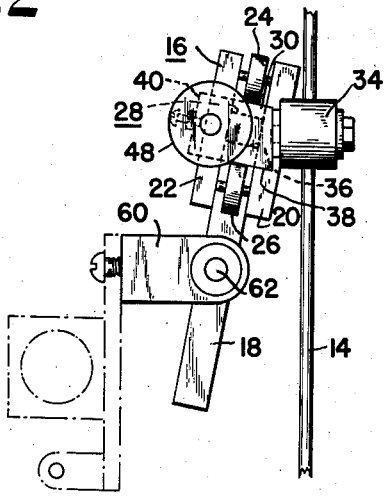
Figure 4 is a vertical side view of the mechanism looking at it from the opposite side.
Figure 5:
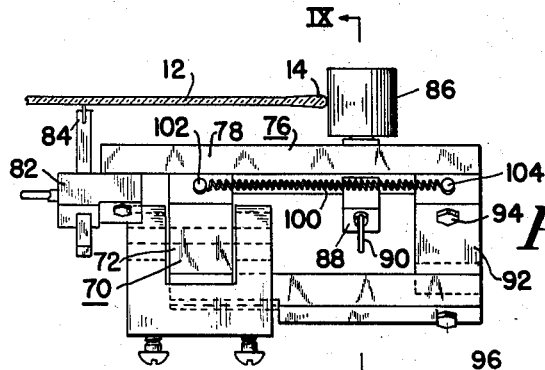
Figure 5 is a horizontal view of a modified form of bulb-edge glass-cutting mechanism in an operating position.
Figure 6:
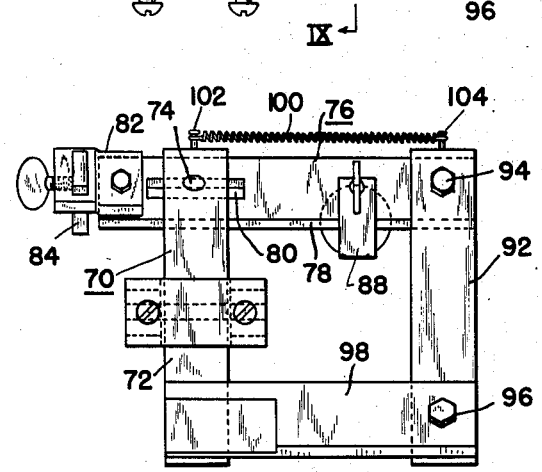
Figure 6 is an elevational view of the embodiment shown in Figure 5.
Figure 8:
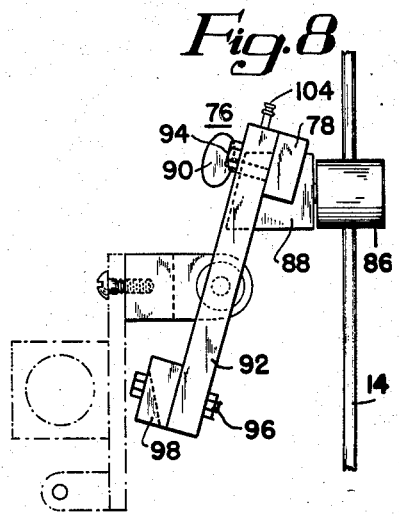
Figures 7 and 8 are, respectively, an end view looking at the glass-cutter side, and an end view looking at the opposite side of the modified mechanism.
Figure 7:
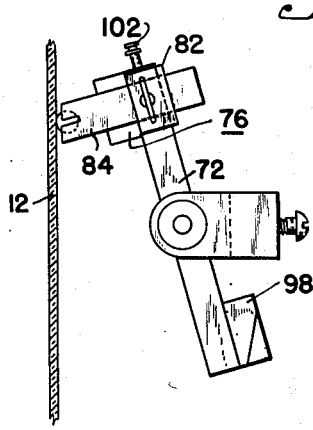
Figure 9:
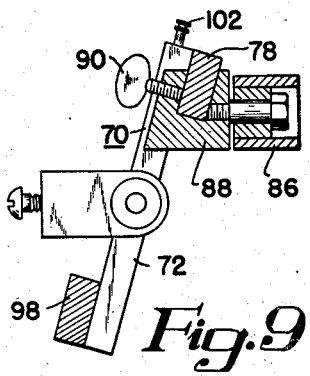
Figure 9 is a sectional view taken substantially in the line IX—IX of Figure 5.

The bar assembly 28 comprises a horizontal slide bar 30 alongside but spaced from the glass sheet 12, a glass-cutter carrier 32 bolted to an end of the slide bar 30, and a bulb-edge following means attached to the other end of the slide bar 30, preferably adjustably attached thereto. The bulb-edge following means comprises a rotatable guide wheel 34 which is preferably fibre-covered, although any other suitable covering satisfactory for engaging glass can be used. For adjustably attaching the bulb-edge following means to the slide bar 30, the slide bar has an elongated horizontal opening or guideway 36 adapted slidably to hold a comparatively short extension 38 of a lead nut 40 movably meshing with a lead screw 42. The guide wheel 34 is rotatably carried on a suitable shaft that extends at a desired angle from the extension 38 of the lead nut 40, as shown in Figure 4. Bearing blocks 44 and 46 fixed to the slide bar 30 rotatably carry the lead screw 42 so that it can be rotated in the blocks by a hand wheel 48 without axial movement of the lead screw. Accordingly, rotation of the lead screw 42 causes the nut 40 to move on it in a direction depending on the direction of rotation of the hand wheel, so that the position of the guide wheel 34 is correspondingly adjusted.

The glass-cutter carrier 32 of the bar assembly 28 comprises a block having a hole in which a shank 50 of a wheel-type glass cutter 52 is adjustably and removably secured. A set screw 54 screws into an end of the block of the carrier 32 for tightening the glass cutter 52 in the block. It is preferable to have the axis of the shank 50 of the glass cutter 52 at a slight angle to a line perpendicular to the vertically moving glass sheet 12.

The slide bar 30 is of uniform width and slidably fits in the guideway provided between the pairs of rollers 24 and 26 of the guide bar holder 16, so that the bar assembly 28 is laterally or horizontally slidably carried in the guide bar holder 16; and the two parts can be supported as a unit. This unit is pivotally carried in a support means comprising a support yoke 60 having pivots 62 that pivotally engage the lever bar 18 so that the lever bar is in the nature of a first-class lever that slants upwardly toward the glass sheet 12. The weighted upper end of the lever bar 18 causes the glass cutter to press on the glass sheet 12; but the lower end of the lever bar, below the pivots 62, can be associated with any suitable biasing means and with a stop, so that the wheel of the glass cutter 52 will press against the glass sheet 12. Preferably, the support means comprising the support yoke 60 is itself carried, so as to be laterally relatively fixed with respect to the glass-making machine, the position of the support means being, however, laterally adjustable.

Assuming that the bulb-edge glass-cutting mechanism described is mounted on a support means alongside of the glass sheet 12, the periphery of the guide wheel 34 will engage the bulb-edge 14 of the glass sheet. As the glass sheet moves the guide wheel rotates. In the meantime, the wheel of the glass cutter 52 of the glass-cutter carrier 32 scores a line in the glass sheet 12. This line will be spaced from the edge of the bulb-edge 14 a distance that corresponds to the distance between the periphery of the guide wheel 34 and the cutting wheel of the glass cutter 52. This distance is exactly proportional to the distance between the lead nut 40 on the lead screw 42 and the shank 50 of the glass cutter 52.

In order to make the guide wheel 34 follow the bulb-edge 14, when the glass sheet weaves laterally or sideways, a tension spring 64 has an end anchored to the laterally relatively fixed guide bar holder 16 and an end fixed to the laterally relatively movable bar assembly 28. Specifically this is accomplished by having an end of the spring 64 anchored to a post 66 fastened to the guideway plate 22 of the guide bar holder, and having the other end of the spring anchored to a post 68 fastened to the bearing block 46 of the bar assembly.

When the glass sheet 12 weaves, it moves laterally with respect to the guide bar holder 16. The tension spring 64 continuously pulls on the bar assembly 28, which can slide on the rollers 24 and 26, so that the periphery of the guide wheel 34 is kept continuously in engagement with the edge of the bulb-edge 14 of the moving glass sheet 12, and the glass cutter 52 will always be at a fixed distance from the edge of the bulb-edge 14. This distance is controllable through the lead screw 42. If a strip of different width is to be cut from the glass sheet, the guide bar holder 16 can be adjusted on its support means, and the hand wheel 48 turned to cause the lead nut 40 to move axially on the lead screw 42 to position the guide wheel 34 against the bulb-edge of the glass sheet with the cutter 52 located at a different distance from the bulb-edge.

It is also obvious that different strip-widths can be obtained without adjusting the guide bar support by having the guide bar support initially close to the bulb-edge, or by having the slide bar 30 project farther to the left of the guide bar holder, or by making the spring 64 of suitable length or anchoring it farther to the right on the slide bar 30, or by other similar expedients. In similar manners, a bulb-edge glass-cutting mechanism embodying our invention can be easily accommodated to scoring glass sheet of different widths in lines parallel to the bulb-edges of the sheets.

From the foregoing it is evident that a bulb-edge glass-cutting mechanism embodying our invention comprises a transmitter or sensing means that follows the position of the edge of the vertically upwardly moving glass sheet 12. This transmitter or sensing means includes a member (the guide wheel 34) whose position corresponds, because of the spring 64, to the particular position of the bulb-edge which it contacts. This transmitter member transmits its position to the glass cutter 52 through the interconnection comprising the slide bar 30, so that the glass cutter correspondingly changes its position.

Referring to Figures 5 through 9, a guide bar holder 70 comprises a lever bar 72 that carries a headed guide pin 74 at its upper end. The pin 74 is in the nature of a guideway that horizontally and slidably guides a bar assembly 76 which comprises a slide bar 78 having an elongated slot 80 engaging the pin 74. The bar assembly 76 further comprises a glass-cutter carrier 82 bolted to the end of the slide bar 78 and removably adjustably carrying a wheel-type glass-cutter 84. The bar assembly further comprises a guide wheel 86 frictionally engaging the bulb-edge 14 of the glass sheet 12. The guide wheel 86 is rotatably carried on a shaft extending from a U-shaped block 88 that is adjustably attached to the slide bar 78 by a holding means that comprises a set screw 90. By loosening the set screw, the block 88 can be slid horizontally to any suitable position on the slide bar 78 for accommodating different widths of glass sheet or for cutting strips of different widths. The extreme end of the slide bar 78, opposite to the glass-cutter carrier 82, is pivotally associated with a pivot bar 92. The pivot bar 92 and the slide bar 78 have a pivot connection 94 therebetween. The lower end of the pivot bar 92 is pivoted, through a pivot 96, to an end of a fixed bar 98 that forms part of the guide bar holder 70.

The bar assembly 76 is spring-pressed or biased by means of a spring 100 having an end anchored to a post 102 fastened to the top of the lever bar 72, and having its other end anchored to a post 104 fastened to the top of the pivot bar 92.

In operation of the embodiment shown in Figures 5-9, the glass cutter 84 is pressed against the face of the glass sheet 12 at a distance from the bulb-edge determined by the spacing between it and the guide wheel 86. The guide wheel bears against the edge of the bulb-edge 14 because of the tension in the spring 100 which tends to move or press the slide bar 78 toward the lever bar 72, the movement of the slide bar 78 causing the pivot bar 92 to pivot about its relatively fixed pivot 96.

While we have described certain preferred embodiments of our invention, it is to be understood that it may be otherwise embodied within the scope of the following claim.

We claim:

A glass-cutting device for cutting a moving sheet of glass longitudinally of its direction of travel, said device comprising a slide extending transversely of and slidable transversely of the glass sheet, a guide for guiding said slide, said guide comprising an upper series and a lower series of guide rollers spaced apart to receive said slide, a glass-cutter holder secured to said slide, a lead screw carried by said slide and extending transversely of the glass sheet, a nut theaded on said lead screw, a guide wheel carried by said nut and adapted to engage the edge of the moving glass sheet, and biasing means connected to said slide and said guide for urging said guide wheel against the edge of the moving glass sheet.

LOUIS GIULIOLI.
THOMAS A. INSOLIO.

References Cited in the file of this patent

UNITED STATES PATENTS

| Number | Name | Date |
|---|---|---|
| 1,807,619 | Boush | June 2, 1931 |
| 2,230,651 | Morris | Feb. 4, 1941 |
| 2,310,182 | Munschauer | Feb. 2, 1943 |
| 2,542,473 | Bullman et al. | Feb. 20, 1951 |